United States Patent [19]
Russell et al.

[11] 3,800,288
[45] Mar. 26, 1974

[54] COMPUTER-DIRECTED PROCESS CONTROL SYSTEM WITH CRT DISPLAY

[75] Inventors: Douglas D. Russell, Wrentham; Henry A. George, Mansfield, both of Mass.

[73] Assignee: The Foxboro Company, Foxboro, Mass.

[22] Filed: Feb. 24, 1972

[21] Appl. No.: 228,983

[52] U.S. Cl. ............................................ 340/172.5
[51] Int. Cl. .............................................. G06f 3/14
[58] Field of Search....... 340/172.5, 324 A, 324 AD

[56] References Cited
UNITED STATES PATENTS

| | | | |
|---|---|---|---|
| 3,683,359 | 8/1972 | Kleinshnitz | 340/172.5 X |
| 3,599,159 | 8/1971 | Creech et al. | 340/172.5 |
| 3,693,163 | 9/1972 | Johnson et al. | 340/172.5 |
| 3,603,966 | 9/1971 | Gregg et al. | 340/172.5 X |
| 3,651,484 | 3/1972 | Smeallie | 340/172.5 |
| R27,239 | 11/1971 | Ulrich | 340/172.5 |

Primary Examiner—Harvey E. Springborn
Attorney, Agent, or Firm—Bryan, Parmelee, Johnson & Bollinger

[57] ABSTRACT

An industrial process control system including a digital computer arranged in a time-share configuration to perform calculations respecting a plurality of process conditions, and to produce corresponding command signals for respective process operators such as valves and the like. The system includes an operator's console unit having a CRT display controlled by a recirculating refresh memory. Character words can be entered into the memory by a keyboard, or by the computer. The memory also carries control bits for each character word, signifying whether that word represents a protected or an unprotected character. If protected, it cannot be changed from the keyboard. The processor can command data transfer operations to or from all unprotected locations, or alternatively can command data transfer operations to or from all locations, regardless of its protect status. Various displays can be called up on the CRT screen for interactive processing by the operator making use of the protected status of certain of the characters stored in the memory.

8 Claims, 20 Drawing Figures

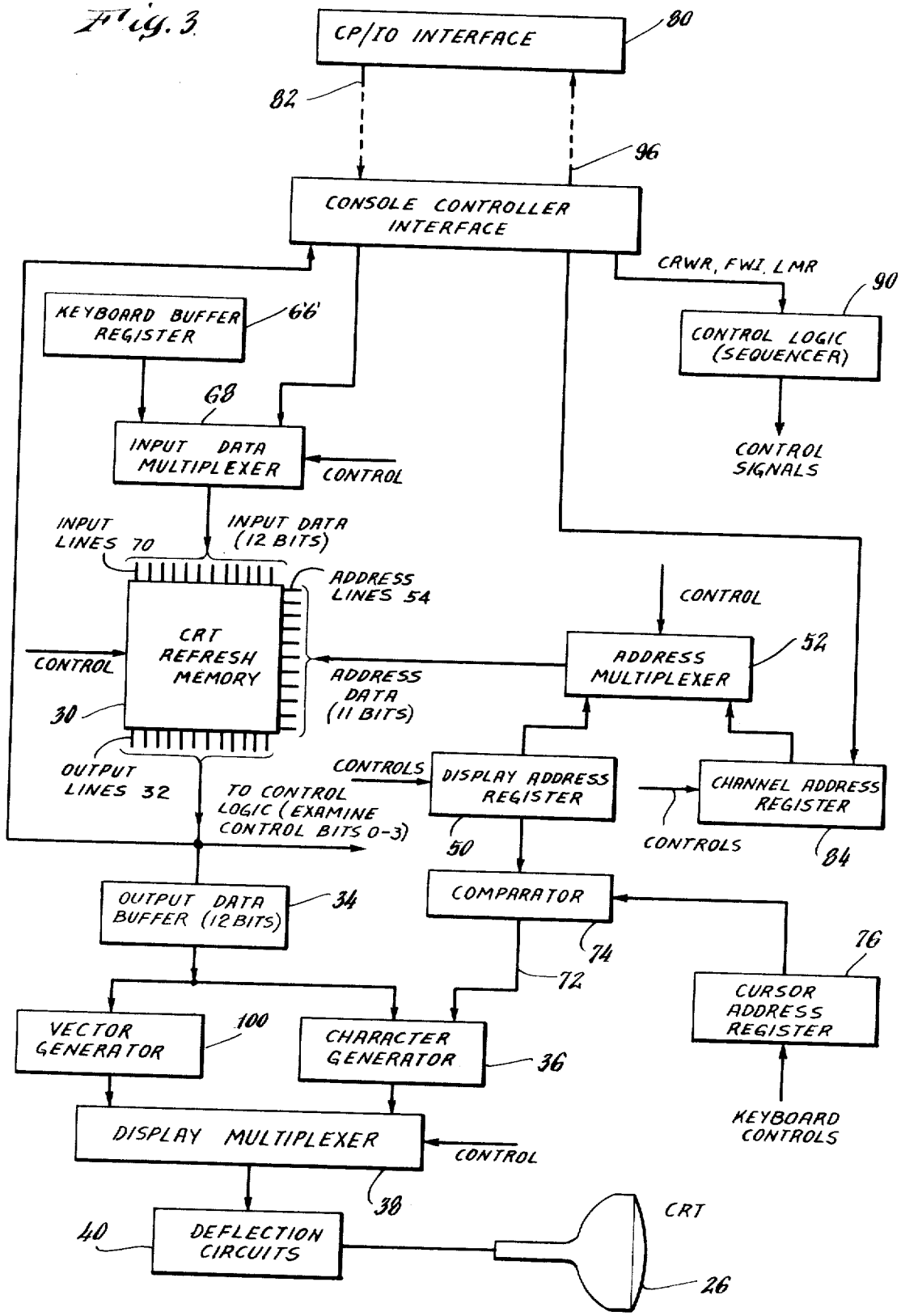

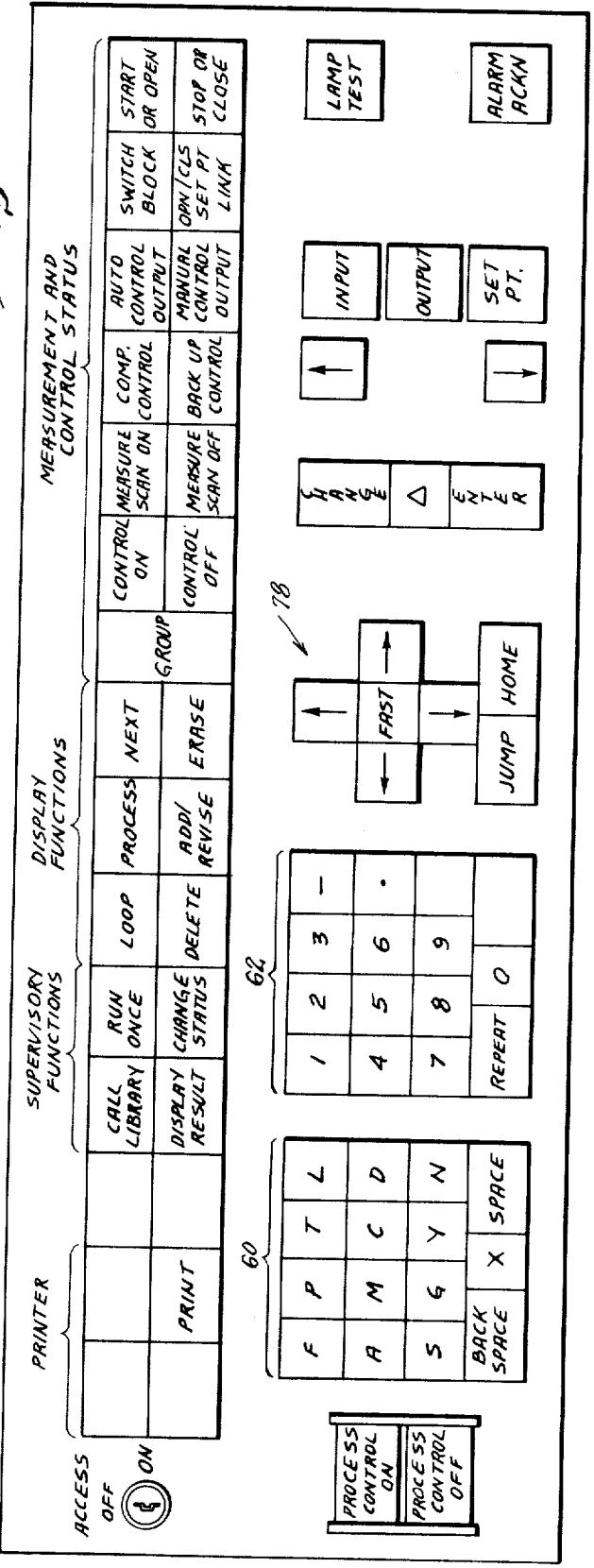

Fig. 7.

|          | BLOCK ID | VARIABLE | LOW | HIGH |
|----------|----------|----------|-----|------|
| RECORDER 1 | | | | |
| PEN 1    | -----    | -        | --- | --- |
| PEN 2    | -----    | -        | --- | --- |
| PEN 3    | -----    | -        | --- | --- |
| RECORDER 2 | | | | |
| PEN 1    | -----    | -        | --- | --- |
| PEN 2    | -----    | -        | --- | --- |
| PEN 3    | -----    | -        | --- | --- |

VARIABLES

1 = SETPT                         2 = INPUT 1
3 = CONTROL BLOCK MEAS. INPUT     4 = INPUT 3
5 = INPUT 3                       6 = SCAN BLOCK MEAS.
7 = BLOCK OUTPUT

COMPUTER-DIRECTED PROCESS CONTROL SYSTEM WITH CRT DISPLAY

BACKGROUND OF THE INVENTION

1. Field of the Invention

This invention relates to industrial process control systems of the type including a central processor which functions in a time-share mode to make calculations respecting a large number of variables, such as process conditions, and to produce corresponding information or command signals for a variety of purposes such as positioning process valves or the like. More particularly, this invention relates to such systems having visual display means for presenting to the process operator or process engineer intelligible information to aid such personnel in exercising control over the process.

2. Description of the Prior Art

Computer-operated control systems have been in use for a number of years with various kinds of industrial processes. Such systems generally provide some form of visual data display to aid the process operating personnel, although for the most part the data displays have been relatively rudimentary and only suitable for limited purposes. Experience with such equipment has demonstrated that the process operating personnel require substantially improved facilities for communicating with the control system in order to exercise the desired close and effective control over a process. There have been a number of proposals to provide elaborate data displays with quite large display capacities, such as large-screen CRT devices. However, for various reasons such apparatus provided or proposed heretofore has not satisfactorily solved the problem.

BRIEF DESCRIPTION OF THE PREFERRED EMBODIMENT

The computer control system to be described hereinbelow includes an operator's console uniquely designed for use by process operators and engineers. It enables communication with the process and permits rapid and convenient access to information about the process, as well as changes to the control system. The console configuration includes a CRT display, a multi-function keyboard, alarm keys, and may include a trend recorder and a printer. Character positions on the CRT can be identified by a cursor which may be moved to any location on the display by manual controls on the keyboard or by the central processor. The cursor does not displace characters. It is used to point to a location for keyboard modification or program use.

The CRT console permits simultaneous display of related process information. Operator-process interaction can take the form of single or multiple entries onto blank(s) or changeable portions of a display. The console provides a parallel, conversational medium with instructional aids and directory displays.

Inherent in the console system design is the concept of local and computer interaction. That is, an operator may change, write over, or insert characters in unprotected areas of a display without requiring computer servicing and without changing computer memory. The computer is involved as necessary to send or receive information. Call sequences for displays are designed to permit ease of going from overall summarizing formats to in-depth presentations of a small sector of the control network.

All functions and procedures are oriented to a process operator or process engineer. Information is presented in formats appropriate to the process. Operator console functions are designed to be self explanatory, in terms of purpose and procedure. No knowledge of system operation, software structure, or program languages is required to use the console.

Accordingly, it is a principal object of this invention to provide superior industrial process control apparatus of the type having data display means. Another principal object of this invention is to provide improved methods and techniques wherein image display means may be used to significantly enhance a process operator's capacity to control an industrial process and to perform related functions. Other objects, aspects and advantages of the invention will in part be pointed out in, and in part apparent from, the following description considered together with the accompanying drawings, in which:

FIG. 3 is a schematic block diagram showing the principal components of the CRT display system;

FIG. 5 is a timing diagram showing the time relationship between the different display functions;

FIG. 6 shows a keyboard layout for the CRT display console;

FIG. 7 is a pictorial showing of one possible CRT display;

DETAILED DESCRIPTION OF THE PREFERRED EMBODIMENT

Figure 1:
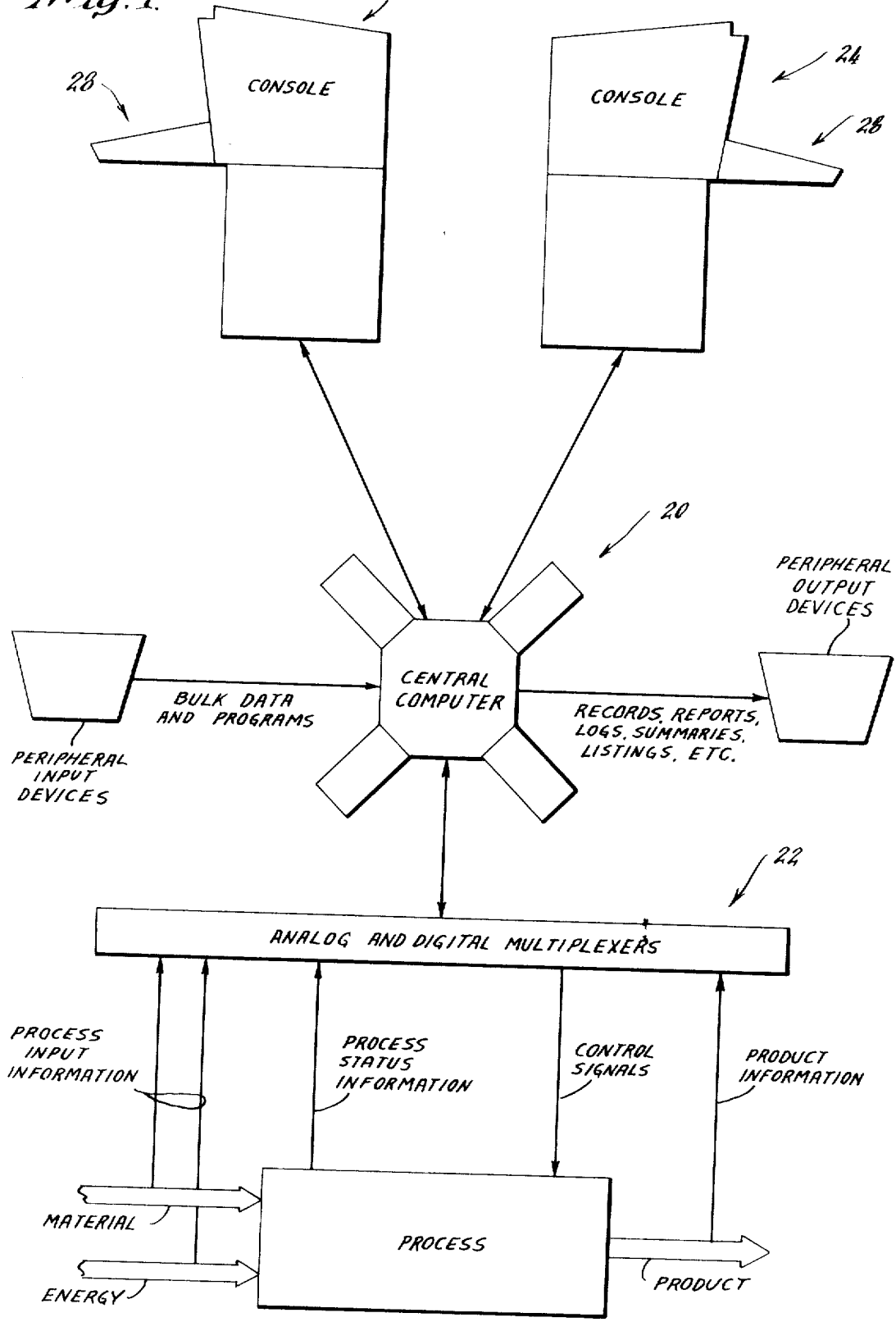
FIG. 1 is a schematic block diagram of a process control system.

Referring now to FIG. 1, the process control system comprises a central-processing input/output (CP/IO) unit 20 in the form of a high-speed digital computer of the general purpose, stored-program type, such as the IBM Model 1800, organized in a time-share configuration to perform calculations respecting a large number of input signals. One group of such input signals is derived from an input multiplexing system 22 arranged to present to the processor a series of measurement signals representing the magnitudes of respective process conditions. Details of one multiplexing system for developing such measurement signals are shown in co-pending application, Ser. No. 228,976, filed by D. O. Hallee, et al., now U.S. Pat. No. 3,761,889. In response to such inputs, the processor develops corresponding information or command signals which are directed to various operating elements such as process valves and the like. Reference may be made to U.S. Pats. Nos. 3,201,572 and 3,582,621 for further details of a computer-operated process control system, particularly with respect to means for developing the valve control signals.

Figure 2A:
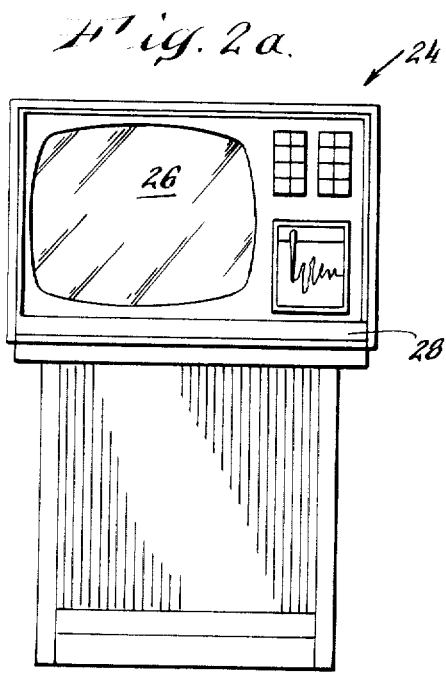
FIG. 2a is a front perspective view of a CRT console for the system of FIG. 1.

The control system also includes one or more operator's consoles 24 (see also FIG. 2a) each of which incorporates a large-screen CRT display device 26 arranged to present alphanumeric characters and other graphic data, including for example, diagrammatic configurations as will be described. The console includes a multi-function keyboard 28 which enables the operator to call up a variety of special displays, and to effectively exercise close control over many aspects of the system. Such console displays can provide continually updated images of total plant functioning, e.g., in terms of raw material inflow and product outflow. The displays may also focus on a process sub-system, individual process unit, control loop, functional block within a loop, or even selected variables. The displays are formatted to provide information as well as to guide the operator in directing the control action of the system. The displays include fill-in-the-blank formats which cooperatively function together with computer software processing to provide the operator with powerful and effective tools for manipulating the process.

Referring now to FIG. 3, the display of the CRT 26 is basically controlled by a conventional refresh memory 30 containing binary data words which define the characters (and other graphic images) to be produced on the screen of the CRT. The stored data words are periodically and sequentially read out through the output lines 32 to an output data buffer 34 which supplies the signals to a character generator 36 (when alphanumeric characters are to be displayed). This character generator produces CRT control signals which are directed through a display multiplexer 38 to the deflection circuits 40 for the CRT 26. The deflection circuits perform digital to analog conversion and operate in the usual fashion to form the display characters on the screen of the CRT.

Although various types of memories could be used, it is preferred to employ a dynamic memory of the semiconductor type. Access to the stored data can be obtained rapidly and at random, by supplying appropriate addressing codes to the memory address lines. Such memory devices require separate Write and Read control signals, which can readily be developed by associated logic controls.

The refresh memory 30 has a capacity to store 2048 12-bit words, but because of system considerations only 2000 words ordinarily will be stored. When alphanumeric character words are stored in the memory, there is a one-to-one mapping relationship between the memory storage locations and the display locations on the face of the CRT. The CRT screen has a 12″ × 15″ usable display area, and is arranged to present 2000 alphanumeric characters in 25 lines of 80 characters each. The characters are 0.24 inches high by 0.12 inches wide.

Figure 4:
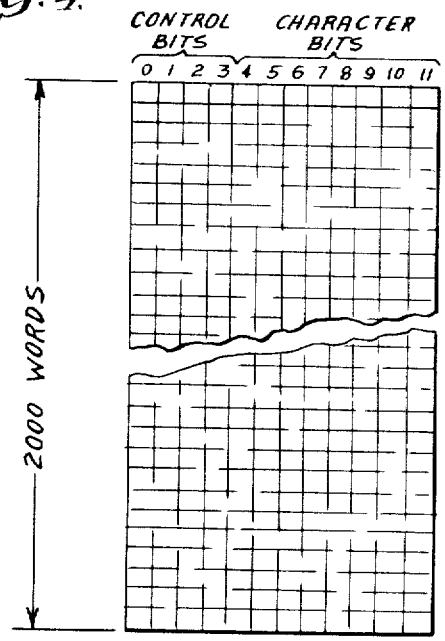
FIG. 4 is a pictorial illustration of the refresh memory for the CRT display.
Figure 2B:
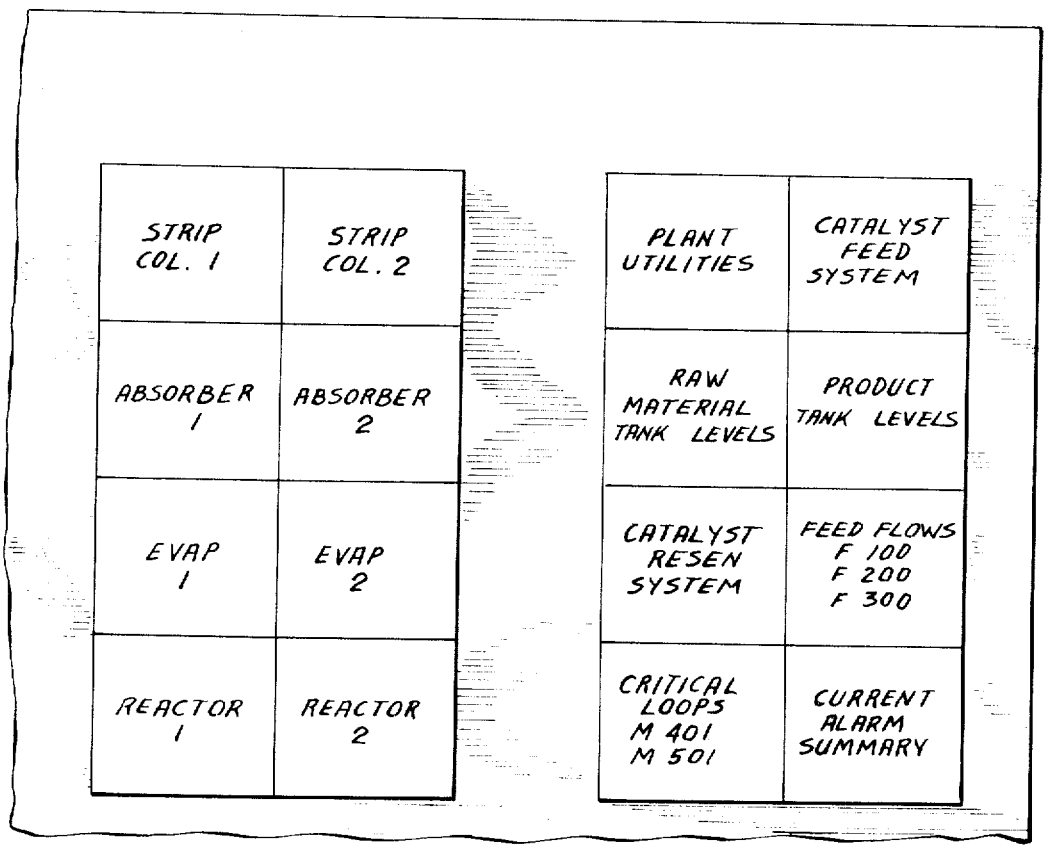
FIG. 2b is an enlarged portion of FIG. 2a showing the alarm keys.

Referring also to FIG. 4, which is a pictorial illustration of the separate storage bins of the refresh memory 30, it will be seen that each of the 2000 storage words contain 12 bits. The last 8 bits define the display character in standard ASCII code. The first 4 bits are for control purposes. Specifically: bits No. 0 and No. 1 together define the display mode as either alphanumeric or vectorgraphic (to be discussed more fully hereinafter); bit No. 2 is the so-called "protect" bit, the function of which will be explained hereinbelow; and bit No. 3 determines whether the character is presented steadily or with periodic blinking.

The primary function of the refresh memory 30 is to periodically present to the CRT all of the stored character and/or symbol data, so as to refresh the visual display on its screen at a sufficiently high frequency to avoid flickering. This cyclic operation of the refresh memory occurs at the rate of 60 frames per second, and is controlled by a Display Address Register (DAR) 50 the address signals from which are directed through an address multiplexer 52 to the address lines 54 of the refresh memory. At the start of each frame, the DAR is set to its "home" or zero address, corresponding to the upper left-hand corner of the CRT display. Thereafter, the DAR is incremented periodically through the remaining 1999 addresses, to read out the associated data words from the memory as the frame time proceeds through its period (one-sixtieth of a second, typically 16.67 milliseconds).

For each address read out from the DAR, there is a corresponding read-out cycle of the refresh memory 30. This operation is called a display-memory-cycle, or DMC, and takes about 1 microsecond. DMCs occur every 4 microseconds, except when the character to be displayed requires more than 4 microseconds of character generator time, in which case the DMCs will be separated by 8 microseconds.

The display memory cycles (DMCs) are interleaved, on a time scale, with other refresh memory cycles referred to as channel-memory-cycles, or CMCs. During these latter cycles, the refresh memory is read or written into in response to command signals from the CP/IO unit 20. This time-sharing of the refresh memory 30 is illustrated in the timing diagram of FIG. 5. The memory cycles DMC and CMC are initiated by corresponding request pulses referred to as display-memory-request (DMR) and the channel-memory-request (CMR), occurring in alternating fashion. Thus, after a DMC has been completed, and while the character generator is "busy" developing the CRT beam control signals, a CMC can be produced (if requested) to access any address in the refresh memory, to permit data to be written into the memory from the CP/IO unit or to permit data to be read out and transferred to the CP/IO unit.

The protect bit (No. 2) is of special significance in the console operation. When this bit is marked, i.e. a binary "one," the associated character is termed a "protected character." One feature of a protected character is that it cannot be altered in any fashion by the keyboard 28. Storage locations where the protect bit is a "zero" can be written into by the keyboard at the will of the operator.

The keyboard 28, outlined in detail in FIG. 6, includes a set of alphabetic keys 60 and a set of numeric keys 62. When the operator presses any one of these keys, a digital code word identifying the character is stored in a keyboard buffer register 66 (FIG. 3). This coded character is directed to an input data multiplexer 68 which transmits it onto the memory input lines 70 to be loaded into the refresh memory 30 at a specified word position, provided that such word position is unprotected. The loading operation takes place during a display memory cycle (DMC), referred to previously.

The word position to be loaded with the keyboard character is identified on the face of the CRT screen by a movable cursor. Preferably, the cursor is in the form of a small triangular marker located immediately below the identified position. This cursor is produced by the character generator 36 together with any character which already occupies the marked storage position in the memory.

The character generator produces the locator cursor in response to a signal from an output line 72 of a comparator 74. This comparator compares the continuously changing output of the Display Address Register (DAR) 50 with the output of a Cursor Address Register (CUAR) 76 and, when the two are identical, sends a signal to the character generator to develop the cursor image at the CRT display position then identified by the address signals delivered to the memory address lines 54 by the DAR. The CUAR is controllable by special keys 78 on the keyboard, or by CP/IO interaction, so as to permit moving the cursor to any position on the screen.

Before the character in the keyboard buffer register 66 is loaded into the refresh memory 30, the character word already stored in the cursor-identified storage position is examined to determine whether its "protect bit" is a one or a zero. If a zero, the writing operation proceeds normally. If a one, the control logic circuitry is conditioned to prevent any writing into the memory device during the particular memory cycle (DMC) corresponding to the cursor position.

By these means, certain special words, symbols or numbers, etc., placed in the refresh memory 30 by the CP/IO unit, can be made immune to any alteration from the operator's keyboard 28. For example, selected headings of columns in a tabular data display, or certain operating parameters of a control loop, can be made effectively permanent, so far as the process operator's console is concerned, and subject to modification only in accordance with strictly defined procedures established in the computer software which, in turn may cause the protect bit of a word in the refresh memory to be changed from a "one" to a "zero."

Although the keyboard 28 can make limited local alterations to the data stored in the refresh memory 30, the display data is primarily controlled by the CP/IO unit 20. Data transfers between the CP/IO unit and the refresh memory, in either direction, take place through a data bus arrangement referred to as Channel Input/Output, or CIO. The transfer operation is initiated at the CP/IO Interface 80 (FIG. 3) which sends through leads 82 a set of control signals specifying details of the transfer. The ensuing data transfers are transmitted from the CP/IO Interface to the Console Controller Interface via lines 82, or from the Console Controller Interface to the CP/IO Interface via lines 96.

Figure 18:
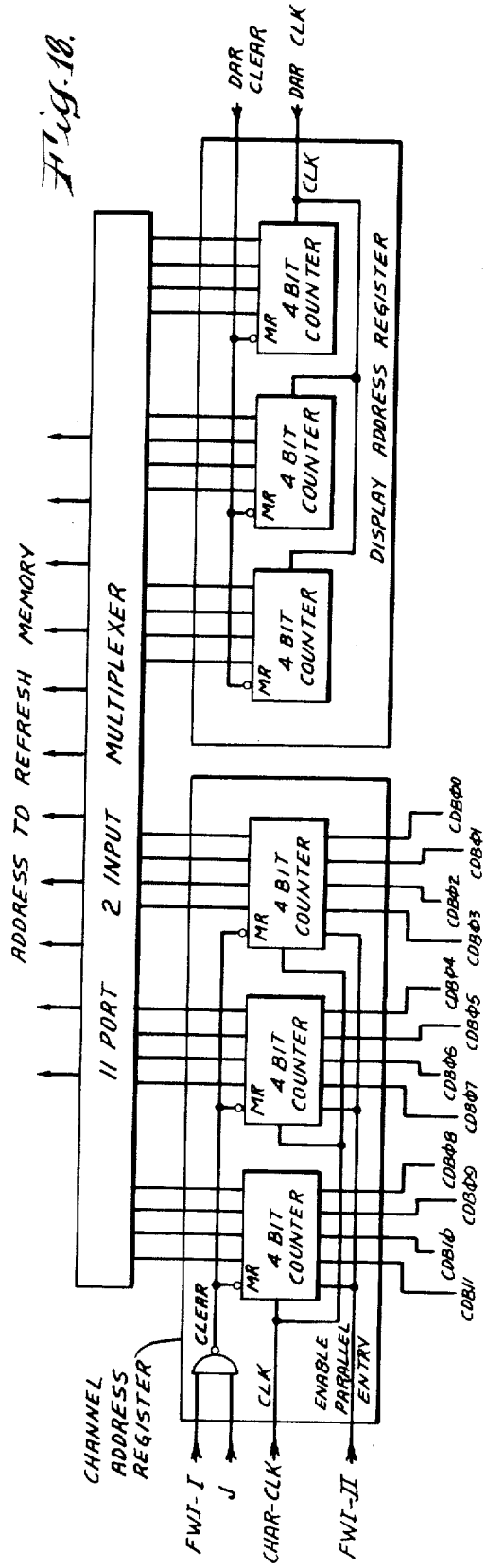

In one embodiment, the control signals were for convenience arranged in two standardized-format, serially-transmitted 12-bit words. The first word contained one bit specifying whether the upcoming transfer was to be of the "protected" or "non-protected" type. Another bit of the first word specified the Read or Write mode, i.e., indicating whether there was to be a transfer from the refresh memory 30 to the CP/IO unit 20, or a transfer from the CP/IO unit to the refresh memory. The second word contained the starting address of the refresh memory for the transfer, this address being loaded into a Channel Address Register (CAR) 84 (FIG. 3) the output of which is directed to the Memory Address Multiplexer 52 (FIG. 18). As indicated in FIG. 5, this multiplexer time-shares the refresh memory between the Channel Address Register and the Display Address Register 50. The Channel Address Register is incremented by suitable controls to identify successive memory addresses as the transfer operation proceeds after all the control information has been loaded and processed.

The control signals delivered by the Interface 80 are analyzed by logic circuitry in the Console Control Logic Circuitry 90, which includes means for examining specified bit locations of the control words. When the control word is found to specify an "unprotected" transfer, data is transferred from (or into) each successive memory location identified by the Channel Address Register 84, regardless of whether the words already stored in such locations contain a marked "protect bit" or not. If a "protected" transfer is indicated by the control word, data is transferred from (or into) only those storage locations which have unmarked (zero) protect bits. That is, the transfer operation will skip over all protected locations in the specified address field, and will operate only on the unprotected locations, in the sequence in which they are encountered.

Display characters typically are transferred to the refresh memory 30 after the two control words have been processed. The data transferred from the CP/IO unit may provide an entire new display, i.e., the procedure may include erasure of all previous characters and insertion of a complete new set of characters, or writing over ome existing characters. In many cases, the new data from the CP/IO unit will represent a response to some action taken by the operator at the console. Any of the characters transferred from the CP/IO may be either protected or unprotected. That is, the protect bit delivered by the computer with each set of character bits may be either marked or unmarked. This decision is made by the CP/IO software in developing each new display.

FIG. 7 illustrates one type of display which might be developed by the CP/IO unit 20 in response to signals from the operator's console. This display is a Trend Pen Assignment form which is used to assign specific recorder pens to corresponding variables. The underscore blanks are unprotected, but all other spaces are protected.

To facilitate entry of alphanumeric characters into the unprotected underscore positions, the CRT control circuitry is provided with the capability of automatically moving the cursor to the first unprotected location following a protected location. To put this procedure into effect, the operator first presses a key titled "Home" (FIG. 6). This key activates circuitry operable, in conventional fashion, to return the CUAR 76 to its zero count condition, thereby moving the cursor to the upper left-hand corner of the CRT display area. Then the operator presses a key called "Jump" which activates special control circuitry for incrementing the CUAR and, at each position, testing for the protect bit of the corresponding word in the refresh memory. At the first unprotected word position, following a protected position, the CUAR incrementing stops, and the cursor is properly located to aid the operator in inserting data in the unprotected location. The Jump key can be used again, with the same display, after selected entries have been made, in order quickly to locate the next place for a keyboard entry to an unprotected location.

After the selected unprotected character locations have been written, the Enter key is activated to indicate to the CP/IO unit that the new data is available. The CP/IO unit will then send back a retrieval command to obtain the newly entered data from the unprotected locations. That is, the first control word will contain a marked bit in one position to indicate a protected transfer, and a marked bit in another location to indicate Read mode.

The retrieval starting address identified in the second control word can be the initial (zero) address of the refresh memory 30. The read-out operation, however, will be limited to the data stored in the unprotected locations. That is, the CHAR will quickly sequence through all of the protected locations, while the control logic examines the character control bits and inhibits any read-out from those locations having marked protect bits. At the first unprotected location, the read-out operation will take place from the output of the memory to the Console Controller Interface and thence through leads 96 to the CP/IO UNIT.

To review: Keyboard data is entered in the refresh memory 30 during a Display Memory Cycle (DMC). One word of data is entered during a refresh memory cycle (one-sixtieth of a second) at the location indicated by the cursor, if a keyboard alphanumeric key is depressed. The refresh memory has a specific bit (data bit No. 2) assigned in each character word which indicates whether the character is protected or unprotected. If the character is protected, it cannot be erased or disturbed in any way from the keyboard. The only way the character can be changed is from the CP/IO unit 20, via the channel input-output (CIO) bus (or another bus, not shown, assigned specifically to control functions). The CIO transfer has two modes of operation, one which recognizes the protected characters and will only read or write into unprotected locations, and another which disregards the protected characters and will read or write into any specified location or series of locations. One bit of the channel control-word specifies the channel mode.

Figure 8:
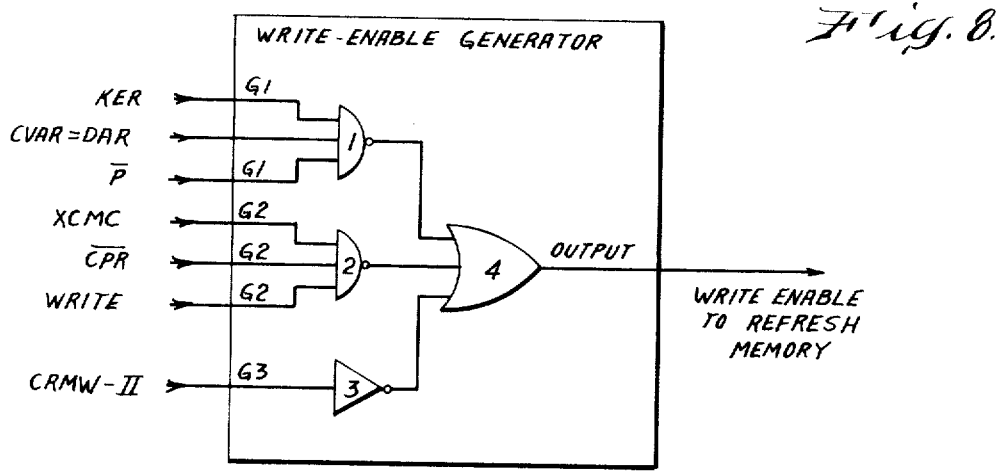
FIGS. 8–18 are schematic block diagrams illustrating logic circuitry related to the protected data transfers.

Although a number of different circuits could be devised for carrying out the logical operation required for the "protect" functions described herein, one specific set of circuits is shown for illustrative purposes in FIG. 8 through 18. Referring first to FIG. 8, the circuitry includes a Write Enable Generator (WEG) which must be activated to enable a write pulse to enter data in the refresh memory 30. When a key is depressed, a Keyboard Entry Request (KER) signal is automatically developed by the keyboard circuitry. KER is gated with the inverted output ($\bar{P}$) of a Protect Latch (FIG. 9) controlled by the protect bit stored in the memory location identified by the cursor. If the character location is protected (protect bit = one), the KER will be inhibited and no change of data will result at that location, because the WEG output will remain low.

Figure 9:
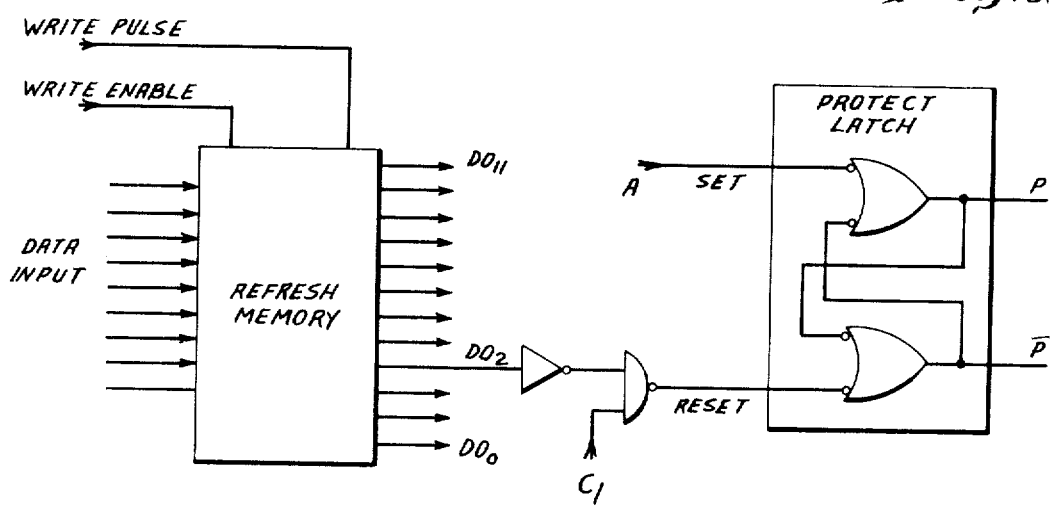

As shown in FIG. 9, the Protect Latch (PL) is set at the beginning of every memory cycle by timing pulse "A." This A pulse is one of four timing pulses A, B, C, D which occur during each memory operate cycle, as indicated in FIG. 5. If the protect bit is a zero, the PL will be reset on timing pulse "C" indicating an unprotected location.

Figure 10:
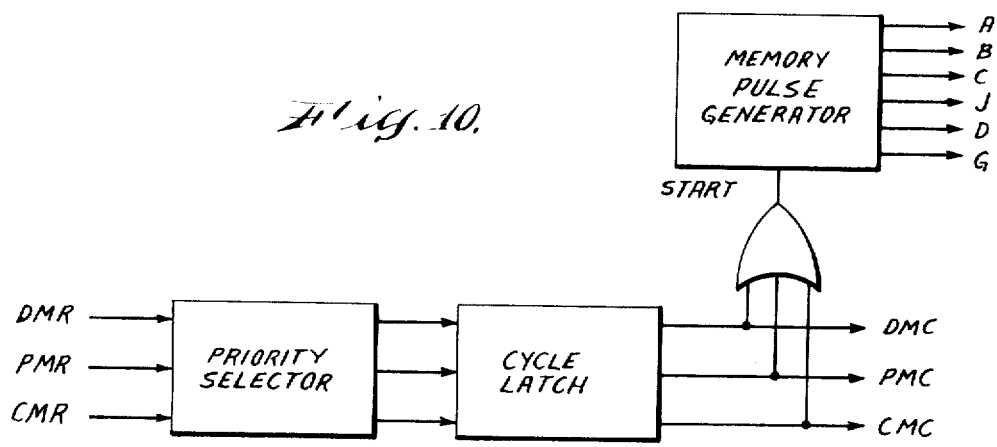
Figure 11:
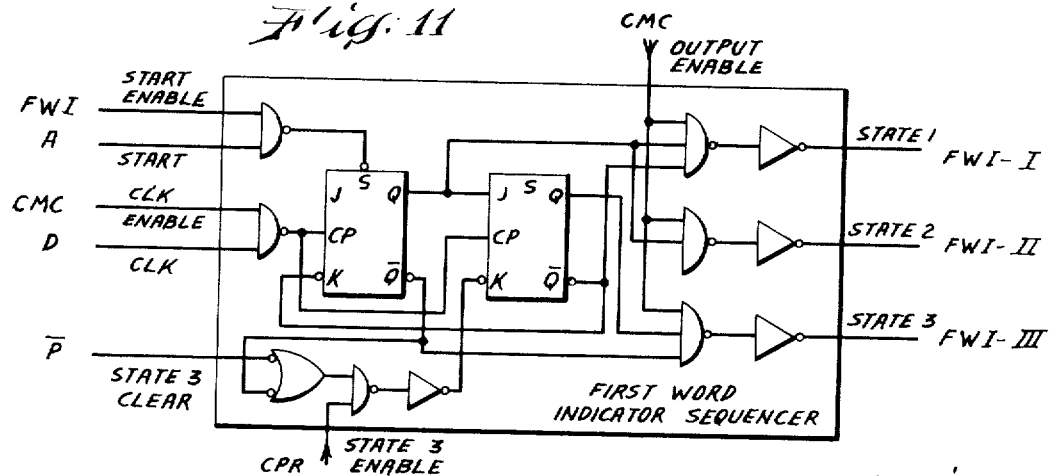

Before every channel data-transfer operation, a control signal called First Word Indicator (FWI) is raised (set) by the console synchronizer in the CP/IO Interface 80. FWI indicates that the first two words transferred will contain control information and channel address. To transfer a word, the console synchronizer causes a signal to be raised called Channel Memory Request (CMR) which will initiate a Channel Memory Cycle (CMC) (FIG. 10). Referring also to FIG. 11, the FWI enables the First Word Indicator Sequencer (FWIS) and, with timing pulse "A," sets the sequencer in state 1 called FWI-I.

Figure 12:
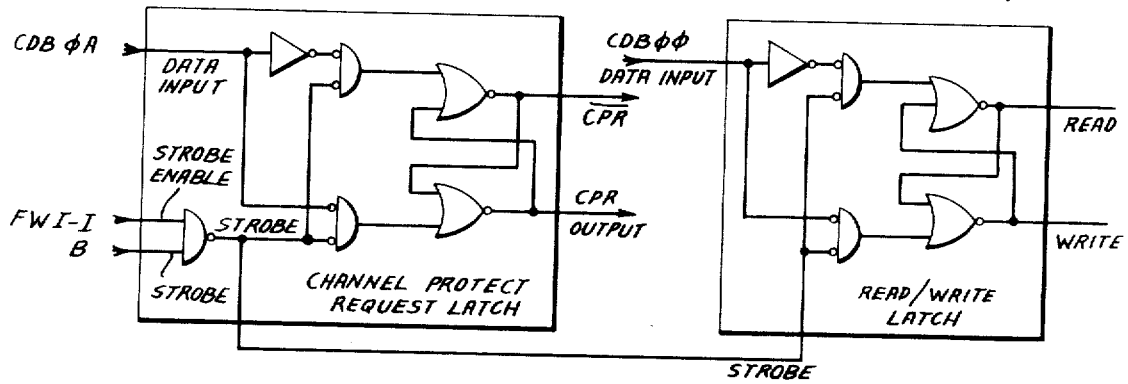

During FWI-I at time "B," the control word is examined and the Channel Protect Request Latch (CPR) is loaded with Channel Data Bus bit 4 (CDB04) (FIG. 12). If CDB04 is a "1," the CPR latch will be set to indicate a transfer only into unprotected locations. If CDB04 is an "0," the CPR latch will be reset indicating a sequential transfer into all locations.

With further reference to FIG. 12, the Read/Write Latch (RWL) is also loaded during FWI-I at time B. If CDB00 is a "0," the RWL will be set to the READ mode indicating a transfer from the refresh memory 30 to the central processing unit (CP/IO) memory. If CDB00 is a "1," the RWL will be set to the WRITE mode specifying a transfer from the CP/IO memory to the refresh memory.

Figure 13:
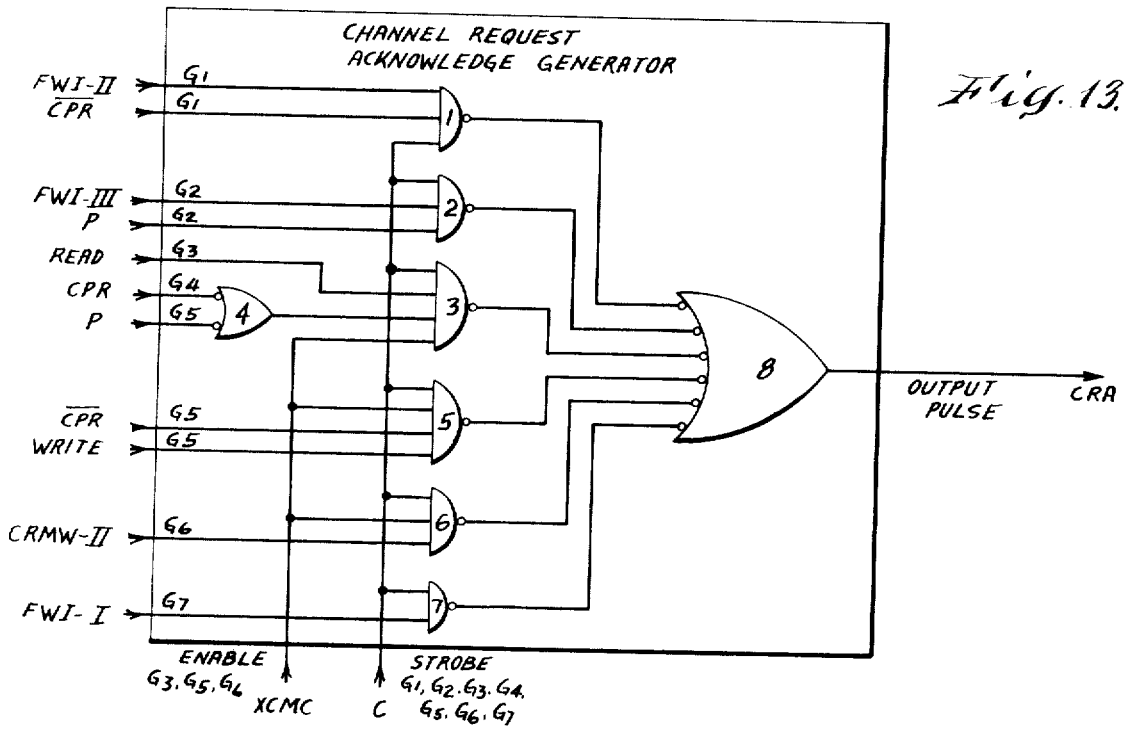
Figure 14:
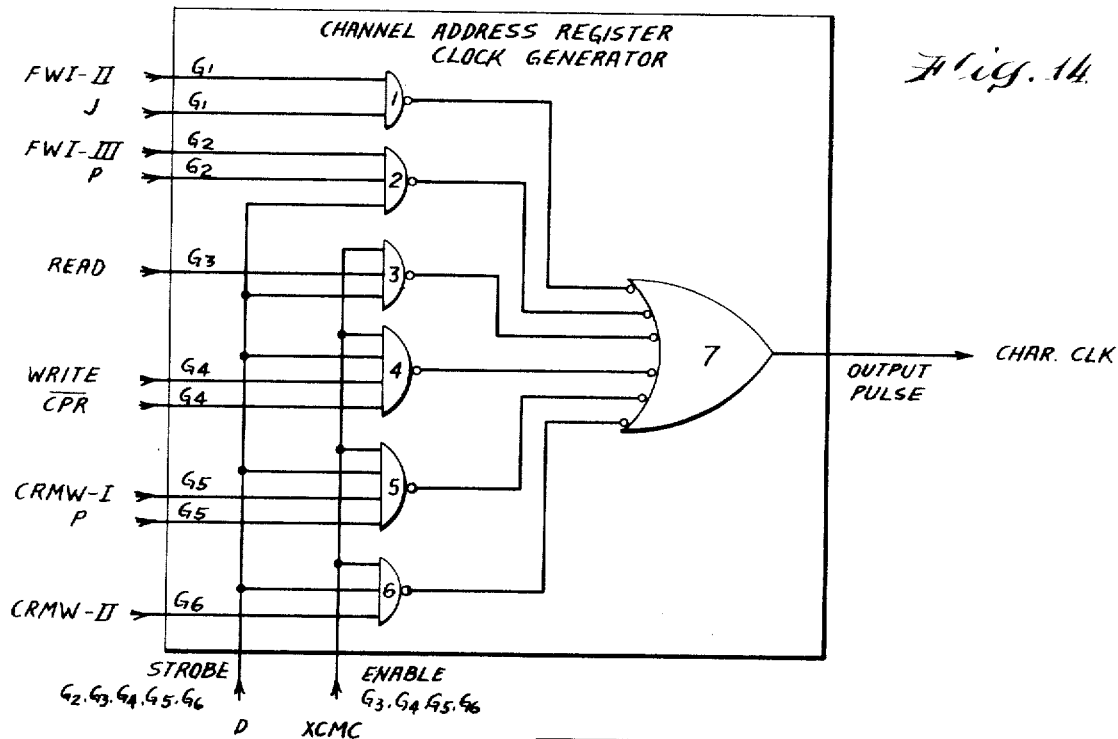

Referring now to FIG. 13, during each CMC the console sends a Channel Request Acknowledge (CRA) back to the console synchronizer (CP/IO Interface 80) via the CRA generator. The CRA during FWI-I is generated via gate No. 7 at a time "C." The final pulse in the cycle, time "D," changes the FWIS from FWI-I to FWI-II. Upon receipt of the first CRA, the synchronizer initiates another CMR to transfer the channel address (second control word) to the console controller.

On the next CMC, the Channel Address Register Clock Generator (CARCG) (FIG. 14) supplies a clock pulse via gate No. 1 which will load the address data on the channel bus in the Channel Address Register (CHAR). Similarly, the CRA generator (FIG. 13) transmits an acknowledge back to the synchronizer via gate No. 1. At time "D" of the CMC the FWIS will either reset itself or enter FWI-III depending on whether CPR is reset or set respectively.

CASE I FWIS resets indicating a transfer of data in sequential locations (CPR=0 RWL = DON'T CARE).

Figure 15:
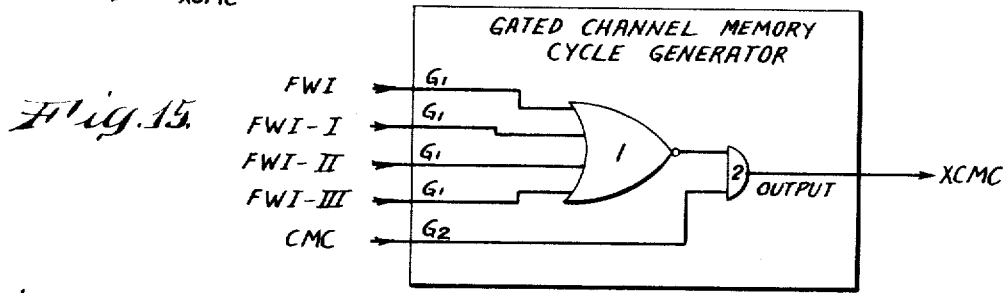

Referring to FIG. 15, upon receipt of the next CMR and subsequent CMC the Gated Channel Memory Cycle Generator (GCMCG) will initiate a gated channel memory cycle (XCMC) which will enable the WEG (FIG. 8) via gate No. 2 provided the RWL (FIG. 12) is in the WRITE mode and the CPR latch is reset. This will allow the data on the channel bus to be loaded into the refresh memory at the location specified by the CHAR. If the RWL is in the READ mode, the data in the refresh memory location specified by the CHAR will be dumped on the channel bus to be read by the CP/IO unit. At time "C" the CRA generator will supply to the console synchronizer an acknowledge via gate No. 3 (FIG. 13) if it is a read cycle or via gate No. 5 if it is a write cycle. At time "D" the CARCG (FIG. 14) will increment the CHAR to the next sequential address via gate No. 3 if it is a read cycle or via gate No. 4 if it is a write cycle.

CASE II FWIS enters state FWI-III (CPR=1 and RWL = Write indicating a transfer of data to only unprotected memory locations).

Figure 16:
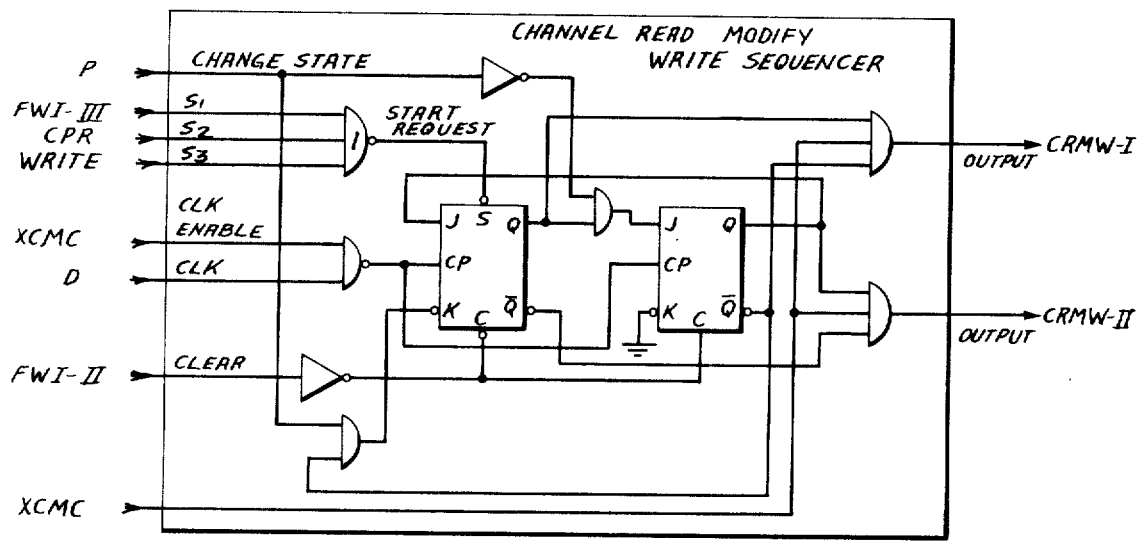
Figure 17:
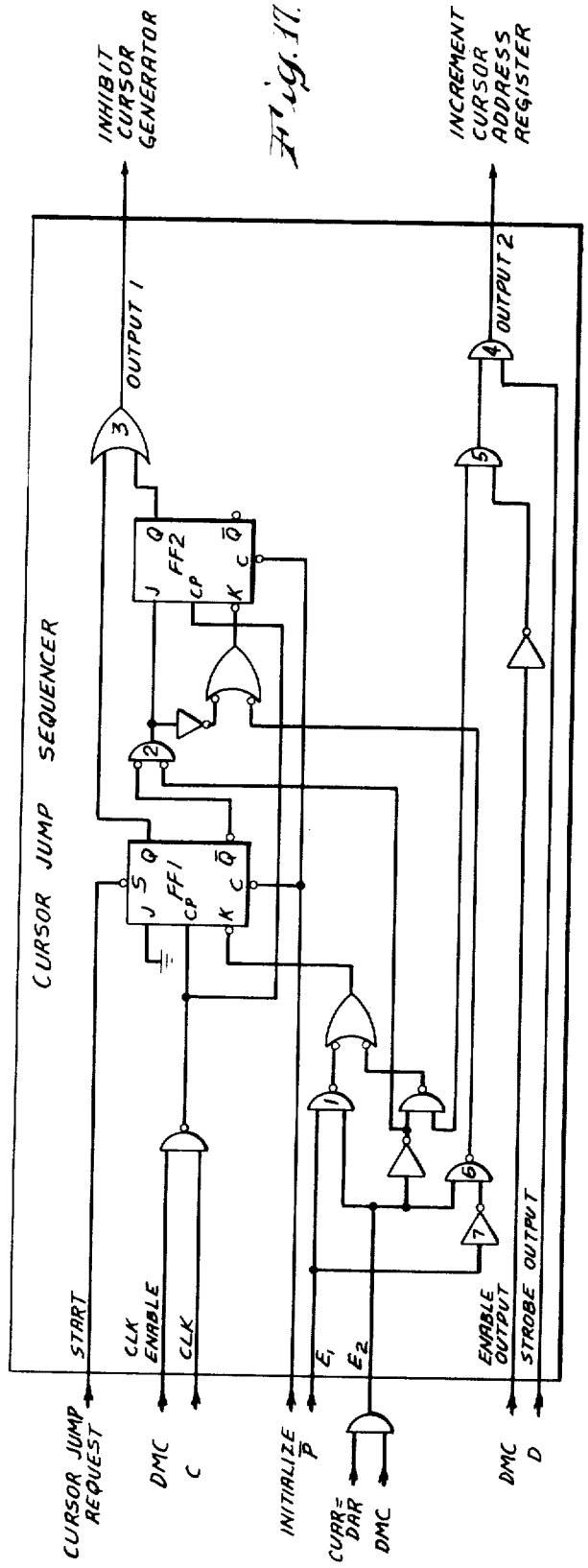

When the FWIS enters FWI-III the Channel Read Modify Write Sequencer (CRMWS) is set to the ready state (FIG. 16). However, no outputs occur at this time because XCMC is low (FIG. 15). Upon receipt of the next CMR and subsequent CMC, the data at the location specified by the CHAR is examined to see if the protect bit is set. If the protect bit is set, the PL remains set and inhibits the FWIS from changing state. Thus, XCMC remains low, and no output occurs from CRMWS. Furthermore, the CRA generator is inhibited because XCMC is low and the WEG is also inhibited until the CRMWS enters state CRMW-II.

Hence, since no acknowledge is received from the CRA generator, the console synchronizer will continue to hold CMR up and a new CMC will be initiated at the next opportunity. On the other hand, an increment pulse to the CHAR is furnished by the CARCG via gate No. 2 at time "D." This advances the CHAR to the next sequential address identifying the next memory location.

This sequence of events continues until an unprotected memory location is found. This will reset the PL thus inhibiting the CARCG and enabling the CRA generator via gate No. 2 (FIG. 13) during time "C." Then at time "D" the FWIS will reset indicating completion of transmission of the two control words. Resetting of FWIS turns off the inputs (all inputs go low) to gate No. 1 of the GCMCG (FIG. 15), so that gate No. 2 is enabled.

Upon receipt of the next CMR, and subsequent CMC, the GCMCG will be enabled and will produce a high XCMC. Thus the CRMWS will display an output state CRMW-I. During CRMW-I the contents of the location specified by the CHAR are examined. Since this location is unprotected (see above), the CARCG will be inhibited and on time "D" the CRMWS will enter state CRMW-II. This will enable the WEG and thus the data present on the channel data bus will be written into the unprotected location. At time "C" a CRA will be generated via gate No. 6 and on the following pulse "D" the CARCG will increment the CHAR via gate No. 6 and the CRMWS will reenter state CRMW-I ready to scan for another unprotected location.

If the next location is protected the CARCG will supply an increment pulse to the CHAR via gate No. 5 and the CRA generator will be inhibited. In this way, sequential locations will be read until another unprotected one is found. The CARCG then will be inhibited, as before, and on time "D" the CRMWS will enter state CRMW-II to transfer the next data word into the unprotected location.

CASE III FWIS enters state FWI-III (CPR=1 and RWL = Read indicating a transfer of data from only unprotected locations).

Upon receipt of the next CMR and subsequent CMC, the refresh memory data at the location specified by the CHAR is examined to see if the protect bit is set. If the protect bit is set, the PL will remain set and, hence, the CRA generator will be inhibited from generating an acknowledge via gate No. 2 since $\bar{P}$ will be low. Nevertheless, an increment pulse to the CHAR is furnished by the CARCG via gate No. 2. This sequence of events occurs until an unprotected location is found which will reset the PL, inhibit the CARCG, and enable the CRA generator via gate No. 2 during time "C."

Then at time "D," the FWIS will reset indicating completion of transmission of the two control words.

Upon receipt of the next CMR, and subsequent CMC, the GCMCG will be enabled since the FWIS is reset. Thus at time "C," the contents of the unprotected location will be valid on the channel data bus waiting to be read by the CP/IO unit. The CRA generator will generate a CHAR increment pulse via gate No. 3. For following CMC's the CARCG will always be enabled via gate No. 3, but the CRA generator will only be enabled on unprotected locations. Therefore, only unprotected locations will be read since the channel bus is strobed during the CRA pulse.

When the cursor JUMP key is depressed on the keyboard 28, FF1 (FIG. 17) of the Cursor Jump Sequencer (CJS) is set to its "1" state which in turn raises the inhibit line to the cursor generator via gate No. 3. The first time that the Cursor Address Register (CUAR) is equal to the Display Address Register (DAR) on time "C," FF1 interrogates the PL and FF2 is set to the "1" state. If the PL is reset ($\bar{P}=1$), then FF1 remains set to the "1" state; however, since FF2 was set on time "C," then on time "D" an increment to the CUAR will be generated via gates No. 4 and No. 5. Therefore, on the next sequential DMC, the CUAR will still equal the DAR. That is, as long as unprotected locations are encountered, the CUAR will track the DAR as the latter spins through the memory addresses.

This tracking sequence will continue until a protected location is encountered, at which time the PL is set ($\bar{P}=0$). Then FF1 will reset to the "0" state thus enabling FF2 to interrogate the PL via gates No. 6 and No. 7. With PL set, FF2 will remain in the "1" state which will continue to inhibit the cursor generator via gate No. 3 and enable the cursor increment via gate No. 5. Accordingly, in this second phase of operations, the CUAR continues to track the DAR, so long as protected locations are encountered.

This second phase sequence continues until an unprotected location is encountered, at which time PL is reset ($\bar{P}=1$). Then on time "C," FF2 will reset and lower the inhibit to the cursor generator, and also inhibit the increment to the CUAR. Finally, on time "D" the cursor generator is activated and the cursor is drawn on the screen at the location specified by the CUAR which is now resting at the first unprotected location after a protected location.

CRT DISPLAY CONTROL DETAILS

The control circuitry writes displays on the face of the CRT by moving the CRT beam sequentially to any of 800,000 individually addressable points. The points, or dots, are organized into 1000 "dot columns" and 800 "dot rows." The spacing between rows of dots and columns of dots is 0.015 inch. Each individual character can be up to 16 dot rows in height and up to 8 dot columns in width. Actual character height thus is 0.240 inch and width is 0.120 inch. Spacing is provided by 4 extra dot columns horizontally between characters and 16 extra dot rows vertically between rows of characters. Each character is arbitrarily defined as beginning in the lower left-hand corner of the 16 × 8 space for the character. The hardware identifies this starting point by X and Y coordinates.

There is a one-to-one correspondence between refresh memory words and character display locations. For example, the word contained in refresh memory address "0," if it is a character, is always displayed in display location "0." The display locations are numbered ascendingly left to right and top to bottom, with display location "0" located in the upper left of the viewing area. The coordinates of the character-starting locations are related to each other. For example, assume that the X and Y coordinates of the starting point for Character Location $n$ are X=20, Y=779. Since there are 12 columns horizontally between character starting points, the coordinates of the starting point for Character "$n+1$" must be $X=32$, $Y=779$. Also, since there are 32 rows vertically between starting points, the coordinates of the starting point for Character Location "$n+80$" must be $X=20$, $Y=747$.

As the first step in writing a character, the CRT beam jumps to the starting point for the character. The coordinates of this starting point are provided to the Character Generator by format control registers. These format control registers consist functionally of two counting registers, one for $X$ coordinates and one for Y coordinates. The X-coordinate register counts up by 12 and the Y-coordinate register counts down by 32.

At the beginning of a display frame, the format control registers are initialized to the X and Y coordinates of Character Location "0," namely $X=20$; $Y=779$. The character specified by the word in refresh memory address "0" is then written in Character Location "0." After completion of the character writing operation, the $X$ coordinate register counts up by 12, so that the starting point coordinates sent to the Character Generator from the format control registers are now $X=32$; $Y=779$. Thus, the character specified by the word in refresh memory address "1" is placed in Character Location "1." This process continues until the character in Character Location "79" has been written. For the next character, the $X$ register reinitializes, and the $Y$ register counts down by 32, so that the starting point coordinates for Character Location "80" are $X=20$; $Y=747$.

Figure 19:
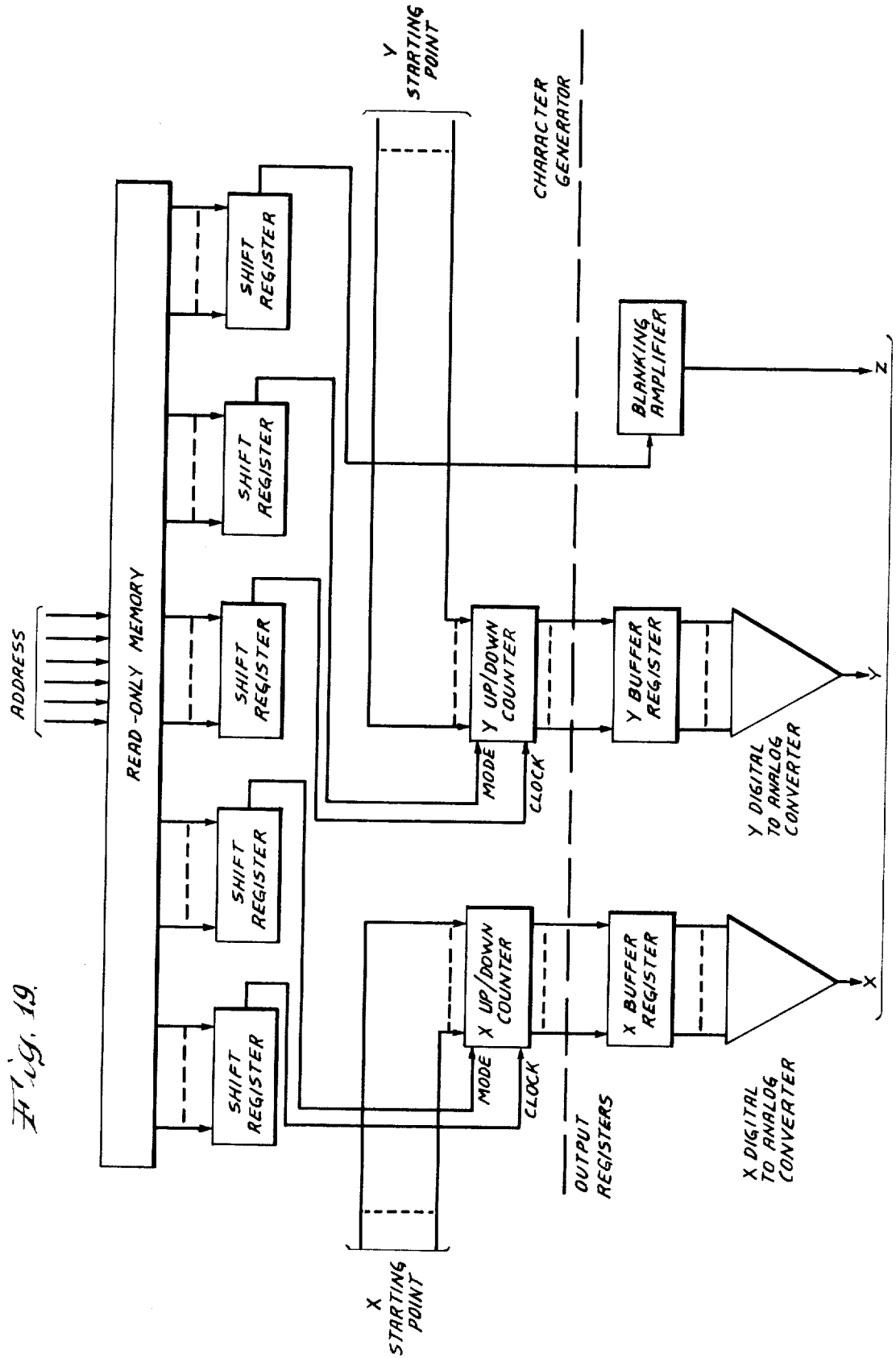
FIG. 19 is a block diagram presentation showing the basic functional elements of the character generator used to develop various diagrams on the CRT screen.

Output registers are provided (FIG. 19) for the Character Generator, to control the CRT beam movement so as to write the character specified by the data word supplied by the refresh memory. At the beginning of a writing operation, the $X$ up/down counter and the $Y$ up/down counter are set to the $X$ and $Y$ coordinates corresponding to the character starting point. The $X$ and $Y$ coordinates contained in the $X$ and $Y$ up/down counters are converted to analog levels by digital-to-analog converters for use by the CRT deflection amplifier. As character writing proceeds, the $X$ and $Y$ up/down counters are appropriately incremented and decremented from data in shift registers, which was provided by read-only memories. After each increment/decrement operation, the new coordinates are converted to analog levels, the beam is successively moved to new locations, and the character is traced out on the CRT face.

The information necessary to define the character shape is stored in a read-only-memory (ROM). For any particular character, a set of digital information words defining the character shape, including blanking (turning the CRT beam on or off), is provided by the read-only-memory. When accessed from the ROM, this information is stored in a set of shift registers, and provided to the up/down counters and blanking amplifier, move-by-move. The following five bits of information are required for each move:

1. X Clock — a bit defining whether the X up/down register is to change;
2. X Mode — a bit defining whether the X up/down register is to increment or decrement;
3. Y Clock;
4. Y Mode; and
5. Z — a bit defining whether the beam is "on" or "off" during the move.

A Vector Generator unit 100 (FIG. 3) is provided to develop a variety of display images comprising a series of connected vectors. This unit accepts a successive pair of 12-bit data words from the refresh memory output data buffer 34. The Vector Generator decodes the two data words to identify the vector as a relative or absolute vector and starts the appropriate initialization procedure for vector generation. Upon completion of the initialization routine, this unit accepts control of the $X$ and $Y$ up-down counters (Output Registers) and supplies the necessary control signals to generate the required vector.

Vector data word pairs are identified by the first two bits of the first 12-bit word. When these bits are 10, a relative vector is identified, whereas 11 identifies an absolute vector, i.e. an absolute vector is one whose starting and ending X, Y coordinates are referenced to some fixed position on the display (typically the lower left-hand corner), as compared to a relative vector the coordinates of which are specified with respect to the current beam position. The remaining ten bits of the first word specify the X coordinate deflection to be effected. The first two bits of the second word provide a control of the line type: dotted, dashed, solid, or blanked. The remaining ten bits of the second word specify the Y coordinate deflection to be effected. When vectors are to be generated, a set of gates (not shown) transfers control of the X up/down counter, Y up/down counter and blanking amplifier to the Vector Generator.

Although a specific preferred embodiment of the invention has been described hereinabove in detail, this is not to be considered as necessarily limiting of the invention, it being understood that numerous changes can be made within the scope of the invention to suit the technical requirements of particular applications.

We claim:
1. An industrial process instrumentation system for use with complex processes having a number of variable conditions, the system including:
 a central data processor organized in a time-share configuration to perform computations respecting the values of the process conditions so as to produce signals for use in controlling the process;
 display means and memory means storing data signals for controlling the production on said display means of visual images;
 said memory means comprising a series of separate storage locations adapted to store data signals which determine the characters displayed by said display means in corresponding positions of said display means;
 means responsive to signals from said processor for storing data signals in said memory means to determine the characters displayed thereby;
 manually operable data entry means for producing data signals and for inserting such data signals into respective locations of said memory means;

cursor means operable with said display means and including means to produce signals identifying a selected location of said memory means and to develop a visible cursor at a corresponding position of said display means to identify where the next character to be entered by said data entry means will appear;

means responsive to said cursor means signals for controlling the operation of said data entry means to store the next set of data signals developed thereby in the location of said memory means identified by said cursor means signals;

protect means to inhibit entry of characters by said data entry means into certain selected storage locations; and cursor control means for controlling said cursor means and operable when activated to position said cursor at the next available unprotected position in a given sequence of character positions.

2. In an industrial process instrumentation system for use with complex processes having a number of variable process conditions such as temperature, flow rate, and the like, said system comprising:

a central data processor arranged to receive signals representing the values of various process conditions, said processor being organized in a time-share configuration to perform sequential computations respecting said process condition values so as to produce corresponding signals for use in controlling the process;

an operating console;

signal transmission means coupling said console to said data processor to transmit signals thereto and receive signals therefrom;

display means forming part of said console for producing visual images in the form of alpha-numeric characters for inspection by an operator;

memory means for storing data signals for controlling said display means, said memory means having a plurality of storage locations each adapted to store data signals for establishing the character image in a corresponding position of said display means;

memory write in means responsive to signals received over said transmission means from said central data processor to store in said memory means data signals identifying selected characters to be displayed on said display means and stored in memory means storage locations corresponding to display means positions where the characters are to be displayed;

manually operable data entry means coupled to said memory means for inserting therein data signals representing characters desired to be displayed on said display means;

means forming part of said memory means to store control signal elements received over said transmission means from said processor corresponding to selected respective memory means locations, each of said control signal elements having a binary characteristic selectively set in accordance with signals received over said transmission means from said processor;

circuit means coupled to said memory means and responsive to said control signal elements;

said circuit means including means to control said data entry means to prevent data signals being inserted thereby into the memory means locations for which the binary characteristic of the corresponding control signal element has a predetermined state, whereby said processor can set up a display on said display means wherein certain characters are unalterable by the operator at said console, in accordance with control signal elements transmitted from said processor to said memory means, and yet character data can be inserted by the operator into certain other character positions by means of said data entry means at said console; and read out means coupled to said memory means to direct data signals read out from said memory means to said transmission means for transmittal on to said central data processor, whereby the functioning of said processor can be controlled by data inserted into selected locations of said memory means and presented on said display.

3. A system as claimed in claim 2, including:

means to sequence said memory means through its storage locations for reading out the corresponding data signals to said read out means; and control means responsive to said control signal elements read out from said memory means for inhibiting the transmission to said data processor of data signals from locations of said memory means where the corresponding control signal elements are of said predetermined binary state, whereby said read out means retrieves from said memory means for said processor only such character signals as may be inserted by said data entry means.

4. A system as claimed in claim 2, including cursor means to produce on said display means a cursor which serves to indicate the position where a character will next be entered by said data entry means; and cursor positioning means for automatically shifting said cursor to a position correspnding to a data signal storage location of said memory means for which the corresponding control signal element has said predetermined binary characteristic.

5. A system as claimed in claim 4, wherein said cursor positioning means comprises means to move said cursor to the next storage location having a control signal element of said predetermined binary state without stopping at any intervening storage location where the control signal element is of a binary state opposite to said predetermined state.

6. In an industrial process instrumentation system for use with complex processes having a number of variable process conditions such as temperature, flow rate, and the like, wherein the system comprises a central data processor arranged to receive signals representing the values of various process conditions, said processor being organized in a time-share configuration to perform sequential computations respecting said process conditions to produce corresponding signals for use in controlling the process, the system further including an operating console and signal transmission means coupling said console to said data processor to transmit signals thereto and receive signals therefrom; display means forming part of said console for producing visual images in the form of alpha-numeric characters for inspection by an operator; memory means for storing data signals for controlling said display means, said memory means having a plurality of storage locations each adapted to store data signals for establishing the character image in a corresponding position of said display means; the console further having manually operable data entry means for inserting into said memory means data signals representing alpha-numeric characters for presentation on said display means; the improved method of operating said instrumentation system comprising the steps of:

transmitting from said processor through said transmission means to said console character data signals representing a series of alphanumeric characters to be presented in predetermined respective positions on said display means;

transmitting from said processor through said transmission means to said console binary control signal elements corresponding to said character data signals respectively and having preselected binary states;

storing said data signals and said control signal elements in locations of said memory means corresponding to said respective positions;

sensing the control signal elements in said memory means;

inhibiting the operation of said data entry means for all positions of said display means where the corresponding control signal element sensed in the preceding step has a predetermined state, while permitting the entry of data signals by said data entry means into any locations the control signal elements of which have an opposite state;

inserting data signals from said data entry means into selected locations of said memory means where the control signal element therefor is of said opposite state; and selectively transmitting from said memory means to said processor for processing only the data signals stored in locations the control signal elements for which are of said opposite state, whereby to develop at said processor all signals which have been inserted by said data entry means while avoiding transmittal to said processor of other signals.

7. The method of claim 6, including the steps of transmitting from said processor to said console for storage in said memory means data signals which produce on said display means symbols indicating special display positions into which additional characters are to be inserted by said data entry means;

the control signal elements for said special display positions being of said predetermined binary state permitting data signals to be entered by said data entry means.

8. The method of claim 7, wherein data signals representing at least one new value for the process control function are inserted through said data entry means into said special display positions.

* * * * *